US005992275A

United States Patent [19]
Castricum

[11] Patent Number: 5,992,275
[45] Date of Patent: Nov. 30, 1999

[54] PIPE CUTTER HAVING NON-ROTATING, OVERLAPPING KNIVES

[75] Inventor: Wilhelmus P.H. Castricum, Palatine, Ill.

[73] Assignee: Lindab AB, Båstad, Sweden

[21] Appl. No.: 08/986,166

[22] Filed: Dec. 5, 1997

[51] Int. Cl.$^6$ .................................................. B21C 37/12
[52] U.S. Cl. ............................. 82/101; 82/102; 82/53.1; 82/82
[58] Field of Search ................................ 82/101, 102, 54, 82/56, 57, 53.1, 82, 47, 1.11; 29/33 D; 83/856–858

[56] References Cited

U.S. PATENT DOCUMENTS

| | | |
|---|---|---|
| 684,539 | 10/1901 | Cartwright . |
| 694,524 | 3/1902 | Boyd . |
| 957,966 | 5/1910 | Jenkins . |
| 1,345,458 | 7/1920 | Pierce . |
| 1,372,040 | 3/1921 | Rendano . |
| 1,478,692 | 12/1923 | Baranoff . |
| 1,635,807 | 7/1927 | Amberg . |
| 1,740,430 | 12/1929 | Mudd . |
| 2,516,817 | 7/1950 | Wernli . |
| 2,749,983 | 6/1956 | Rogers . |
| 3,839,931 | 10/1974 | Herpich . |
| 3,839,933 | 10/1974 | Paramonoff . |
| 3,913,430 | 10/1975 | van Dijk . |
| 4,706,481 | 11/1987 | Castricum . |
| 4,823,579 | 4/1989 | Castricum . |
| 4,924,684 | 5/1990 | Castricum . |
| 5,074,018 | 12/1991 | Bringgeli et al. . |
| 5,105,639 | 4/1992 | Castricum . |
| 5,193,374 | 3/1993 | Castricum ................... 72/49 |
| 5,257,521 | 11/1993 | Castricum . |
| 5,421,185 | 6/1995 | Castricum ................... 72/338 |
| 5,477,717 | 12/1995 | Skrebergene ................. 72/49 |
| 5,609,055 | 3/1997 | Castricum . |
| 5,636,541 | 6/1997 | Castricum . |

FOREIGN PATENT DOCUMENTS

| | | |
|---|---|---|
| 8-300216 | 11/1996 | Japan . |
| 718424 | 11/1954 | United Kingdom . |
| 749389 | 5/1956 | United Kingdom . |
| 784289 | 10/1957 | United Kingdom . |

OTHER PUBLICATIONS

Exerpt from Grainger Catalog: Electric Shears p. 1481, believed to be published prior to Dec. 5, 1997.

*Primary Examiner*—Daniel W. Howell
*Assistant Examiner*—Mark Williams
*Attorney, Agent, or Firm*—Brinks Hofer Gilson & Lione

[57] ABSTRACT

A pipe cutter having non-rotating, overlapping knives is provided. Also provided is a pipe cutter having non-rotatable overlapping knives wherein one of the knives is continuously reciprocated.

20 Claims, 12 Drawing Sheets

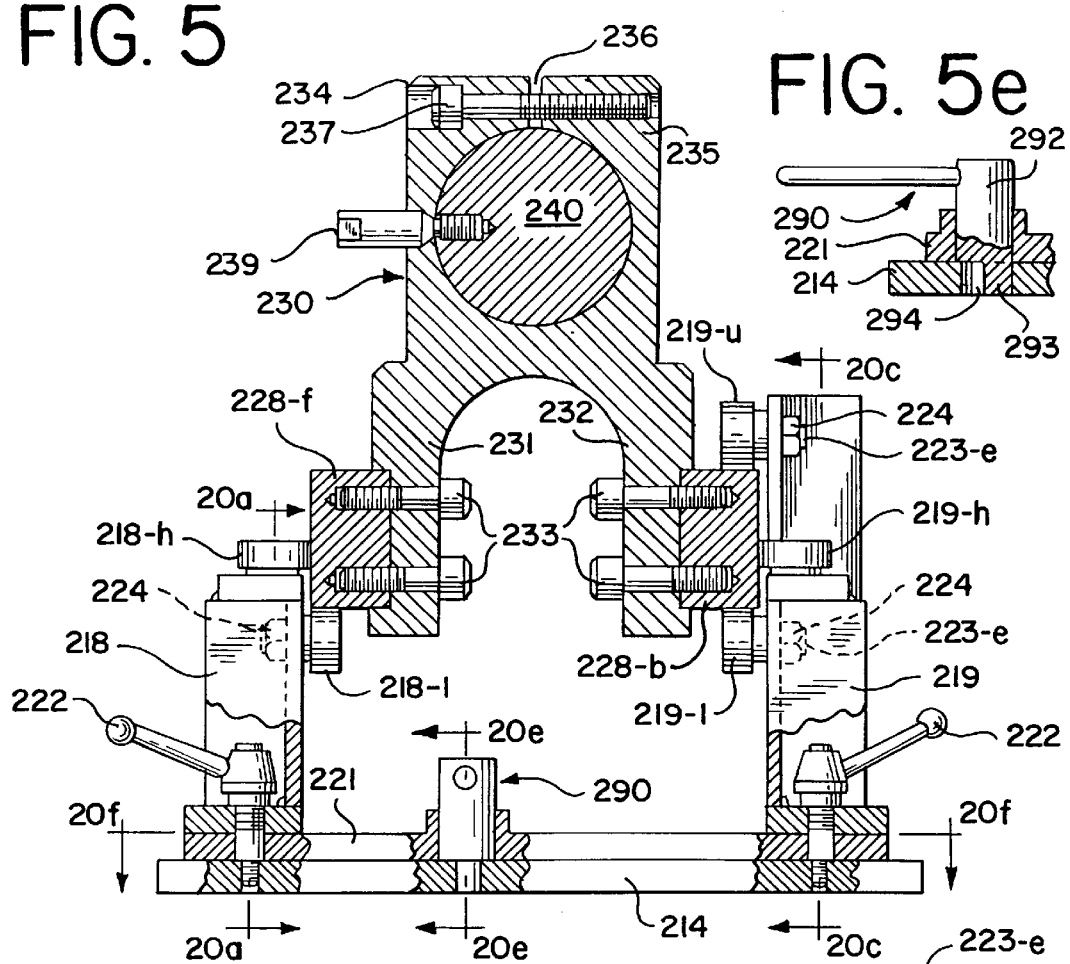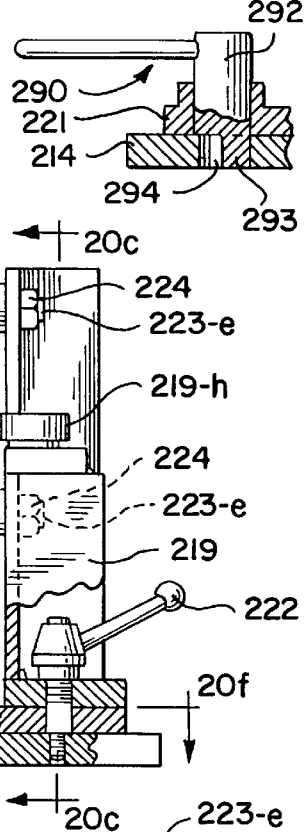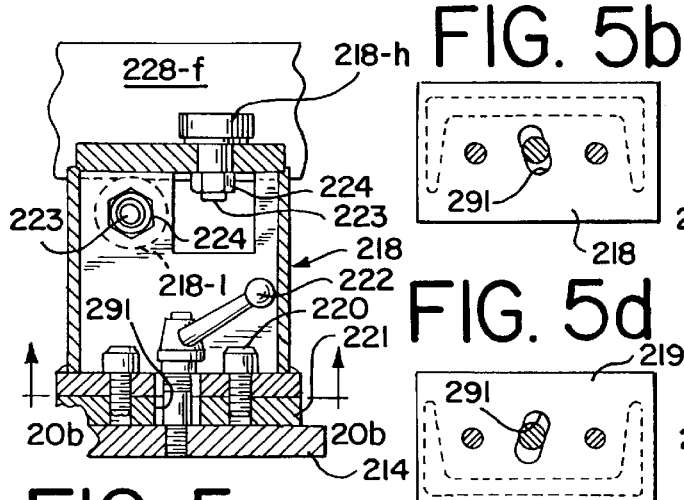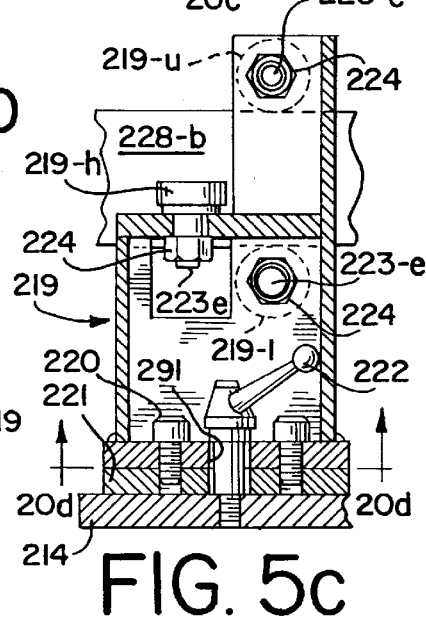

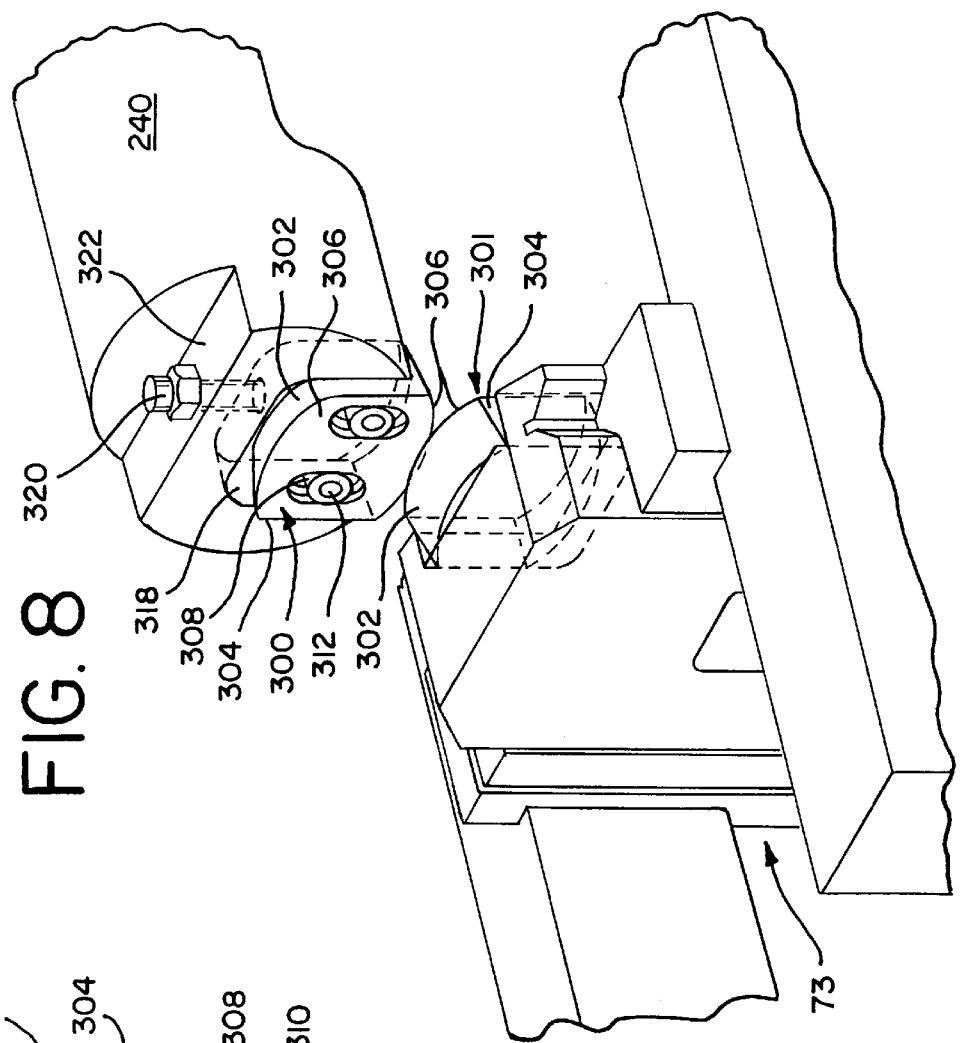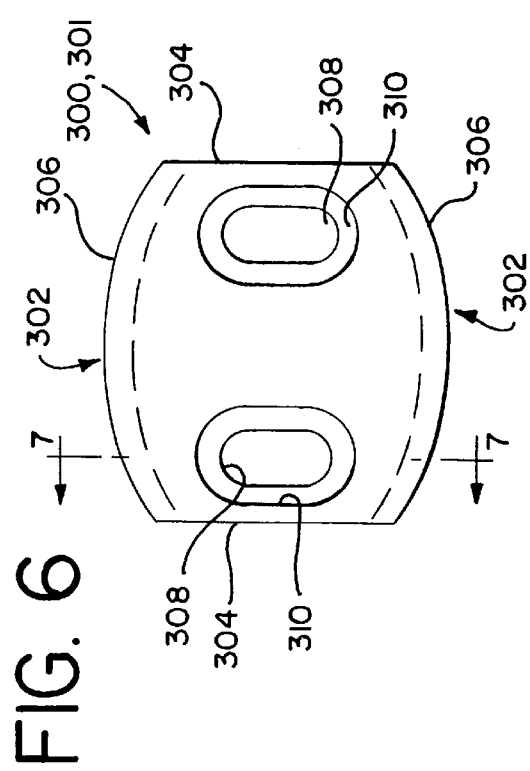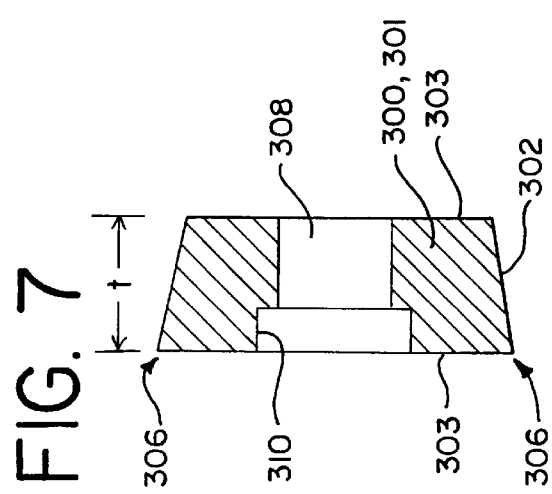

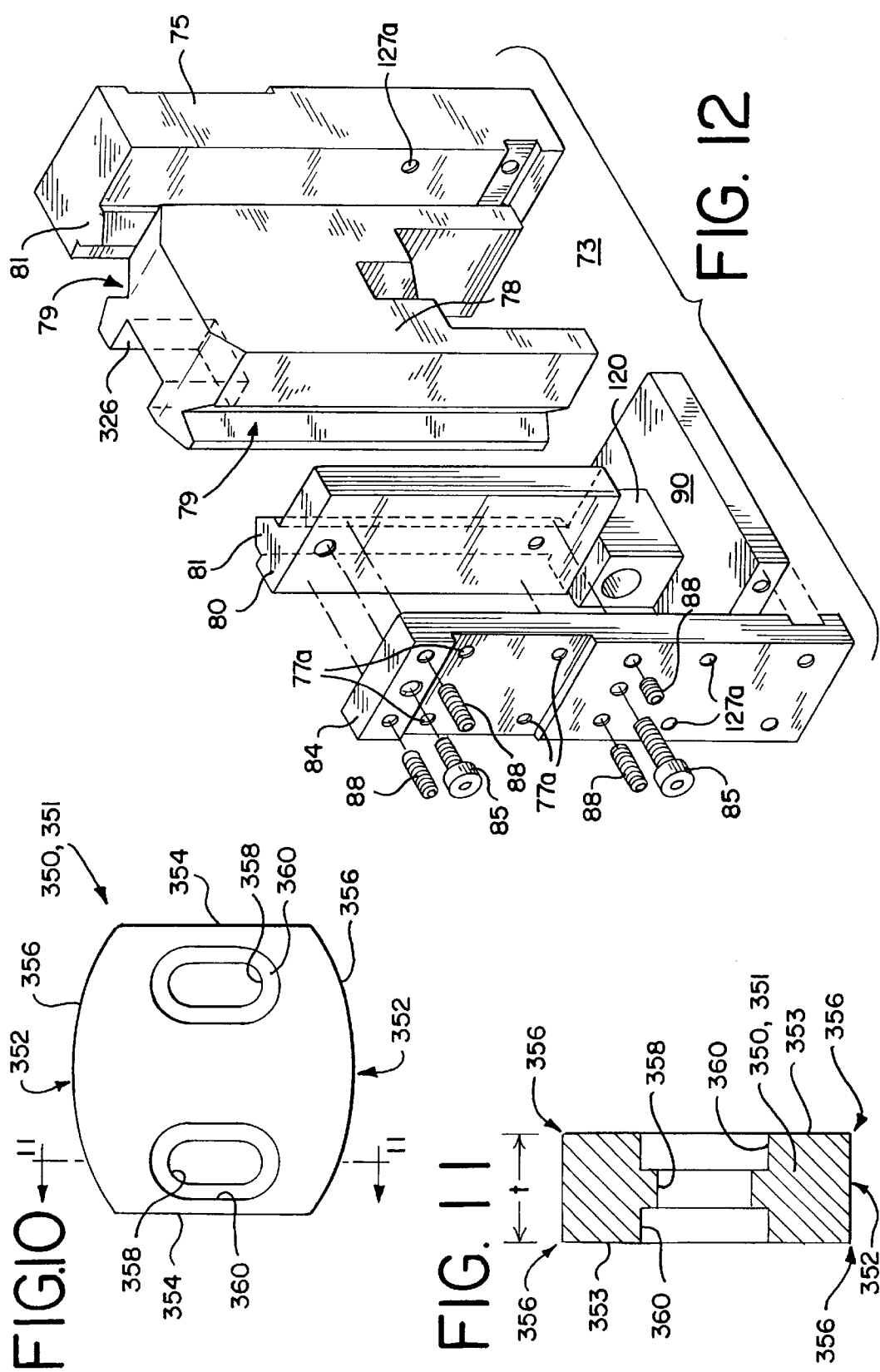

PIPE CUTTER HAVING NON-ROTATING, OVERLAPPING KNIVES

BACKGROUND OF THE INVENTION

This invention relates to an apparatus for cutting spirally formed hollow metal pipes. More particularly, the present invention relates to a pipe cutting apparatus having non-rotatable knives that overlap to cut a rotating pipe.

Hollow metal pipes are widely used for ventilation ducts. These pipes are formed from a continuous strip of thin metal. U.S. Pat. No. 4,567,742, issued Feb. 4, 1986, describes a preferred machine for making triple-ribbed, spiral seam pipe. U.S. Pat. No. 3,132,616 (Hale) describes another type of machine for making corrugated, spiral seamed pipe. Both types of machines start with a flat strip of metal. The strip passes through a series of rollers which bend the edges into predetermined shapes, and form parallel corrugations or reinforcing ribs in the strip. The strip then passes around the inner surface of a forming head (a mandrel) in a spiral manner, so that the strip takes a spiral shape with opposite edges of the strip meshing. The inter-meshed edges of the strip are then compressed to form a pipe with a spiral lockseam. The strip is continuously fed into the machine to continuously produce spiral seamed pipe.

The pipe must be cut when it reaches a desired length. Previously, some pipe cutting machines used a rotary saw for cutting the pipe. In one machine, the saw is mounted outside the pipe, where it does not interfere with the pipe forming process. When the pipe is ready to be cut, it stops moving. The saw blade is then moved into its cutting position and penetrates the pipe. The metal strip material and pipe forming operation then begin again at a slow speed. This causes the pipe to move forward and rotate. The saw is adapted to move axially with the pipe for one complete rotation, whereupon the pipe is completely severed. The saw returns to its starting position, and the cut pipe section is discharged onto a run-off table. The tube forming process is then repeated to produce another section of pipe.

There are several disadvantages to using high speed saws to cut metal pipes. First, the saw blade, which rotates as fast as 5000 RPM, is dangerous to the machine operator and to anyone near the machine. Second, the saw generates a lot of sparks when it cuts the metal, which also creates a hazardous situation. Anyone near the machine must wear safety glasses to protect himself from the sparks. Third, the saw cut leaves burrs on the edge of the pipe. These burrs must be filed off by someone, who must be careful not to cut himself on the burrs. Finally, the cutting operation is very noisy.

Another apparatus for cutting spirally formed pipe uses passively rotatable knives. One rotatable knife is positioned inside the pipe and a second rotatable knife is positioned outside of the pipe. When cutting, the outer knife moves into an overlapping position with the inner knife so that the knives rotate as the pipe rotates and is cut between them. The rotatable knives each require a bearing assembly. Typically, bearing assemblies require multiple additional parts configured in a precise manner.

Accordingly, a pipe cutting apparatus is desirable that overcomes the disadvantages of a high speed saw and is less complex and less expensive than cutters having rotatable knives with individual bearing assemblies.

SUMMARY OF THE INVENTION

The present invention is directed to a pipe cutting apparatus for hollow metal pipes that overcomes the disadvantages of a high speed saw and rotatable knives.

According to a first aspect of the invention, an upper knife is non-rotatably mounted on the front end of a boom. The boom and upper knife are positioned inside the pipe so that the axis of the knife is parallel to the axis of the pipe, and the cutting edge of the knife is adjacent the inner pipe surface. A lower knife is non-rotatably mounted outside of the pipe. The cutting edge of the lower knife should be parallel to the cutting edge of the upper knife and should be perpendicular to the axis of the pipe. To cut the pipe, the holder is moved to a position where the cutting edges of the knives overlap and puncture the pipe. Sliding guide rails carry the boom, holder and knives together in the direction of the pipe, so that the knives cut the pipe perpendicularly to the pipe axis as the pipe rotates between the overlapping cutting edges of the knives.

The knives of the present invention use a shearing action, like scissors, to cut the pipe. The pipe is cut without the sparks, noise and danger of a high-speed saw blade. Thus, the present invention provides a safer environment for manufacturing spiral seamed pipes. Unlike pipe cutters using rotatable knives, the non-rotatable knives of the present invention do not need bearing assemblies so that complexity and maintenance is reduced. Further, the cutting process of the present invention does not leave burrs on the ends of the cut pipe sections. This increases the efficiency of the pipe forming process because manpower does not have to be utilized to deburr the cut pipes. Still further, the cutting apparatus of the present invention may be easily adapted to existing spiral pipe producing machines.

The invention itself, together with further objects and attendant advantages, will best be understood by reference to the following detailed description taken in conjunction with the drawings.

BRIEF DESCRIPTION OF THE DRAWINGS

FIG. 5 is a sectional view taken through lines 20—20 of FIG. 4.

FIG. 5a is a sectional view taken through lines 20a—20a of FIG. 5.

FIG. 5b is a sectional view taken through lines 20b—20b of FIG. 5a.

FIG. 5c is a sectional view taken through lines 20c—20c of FIG. 5.

FIG. 5d is a sectional view taken through lines 20d—20d of FIG. 5c.

FIG. 5e is a sectional view taken through lines 20e—20e of FIG. 5

FIG. 6 is a front view of a non-rotatable knife for use in the pipe slitter assembly of FIG. 1.

FIG. 7 is a cross-section view taken along line 7—7 of FIG. 6.

FIG. 8 is a perspective sectional view of a preferred pipe cutting apparatus in a cutting position.

FIG. 10 is an alternative embodiment of the non-rotatable knife of FIG. 6.

FIG. 11 is a cross-section view taken along line 11—11 of FIG. 10.

FIG. 12 is an exploded view of the lower knife guide assembly.

DETAILED DESCRIPTION OF A PREFERRED EMBODIMENT

Figure 1:
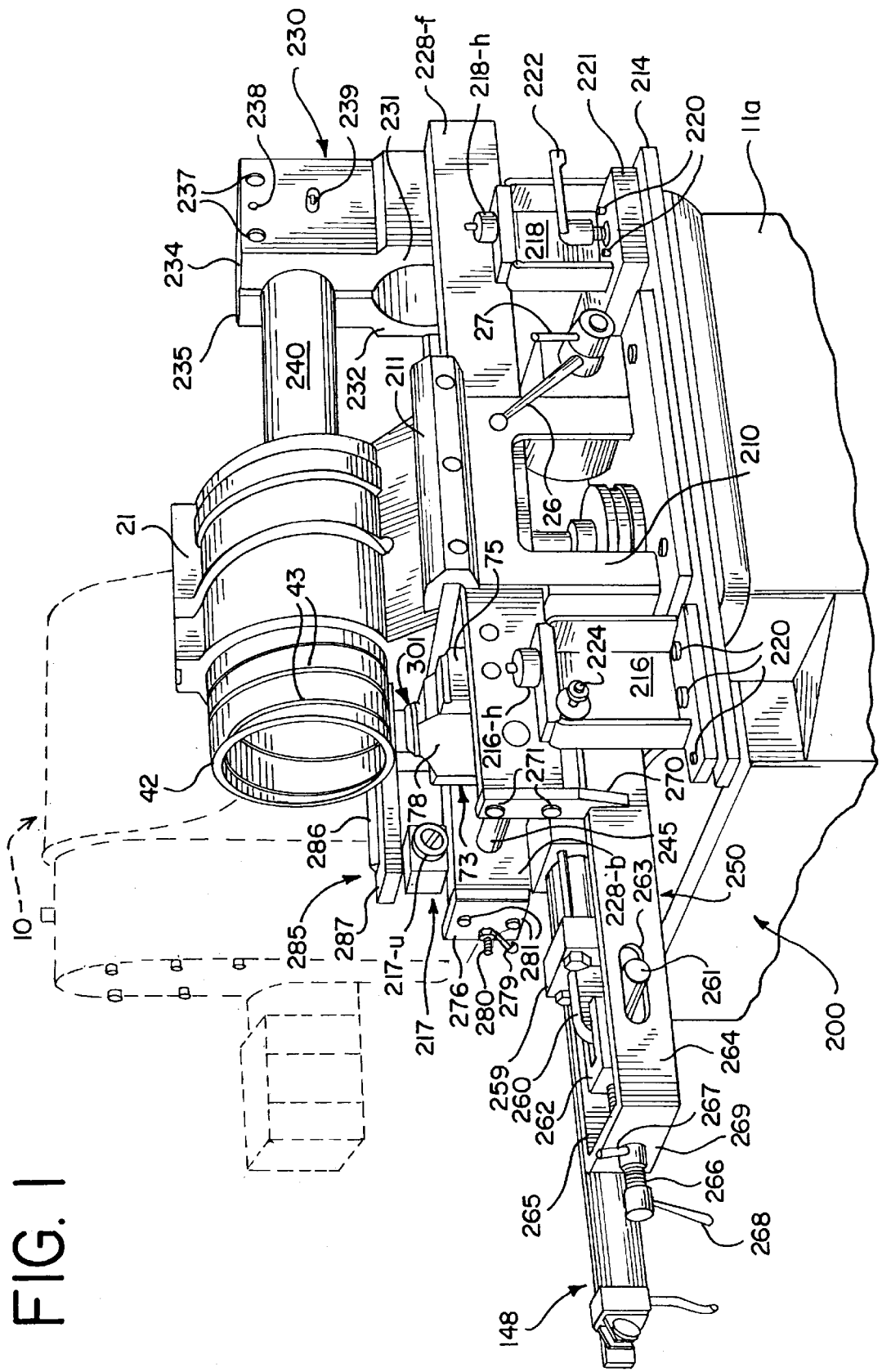
FIG. 1 is a perspective view of a pipe forming and cutting apparatus according to a preferred embodiment of the present invention.
Figure 2:
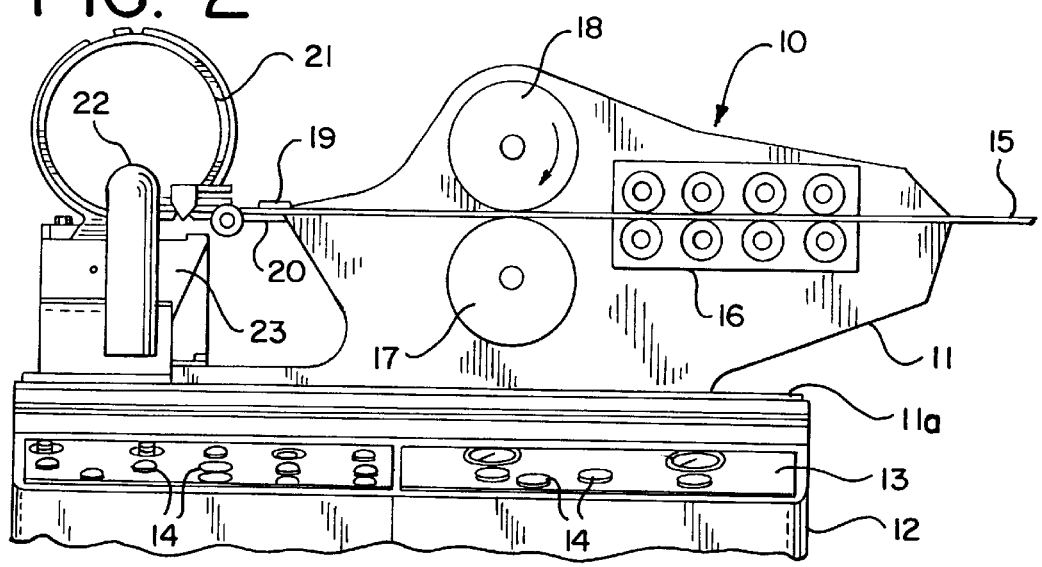
FIG. 2 is a side elevational view of a spiral pipe producing machine to be used with the preferred embodiment of the present invention.
Figure 3:
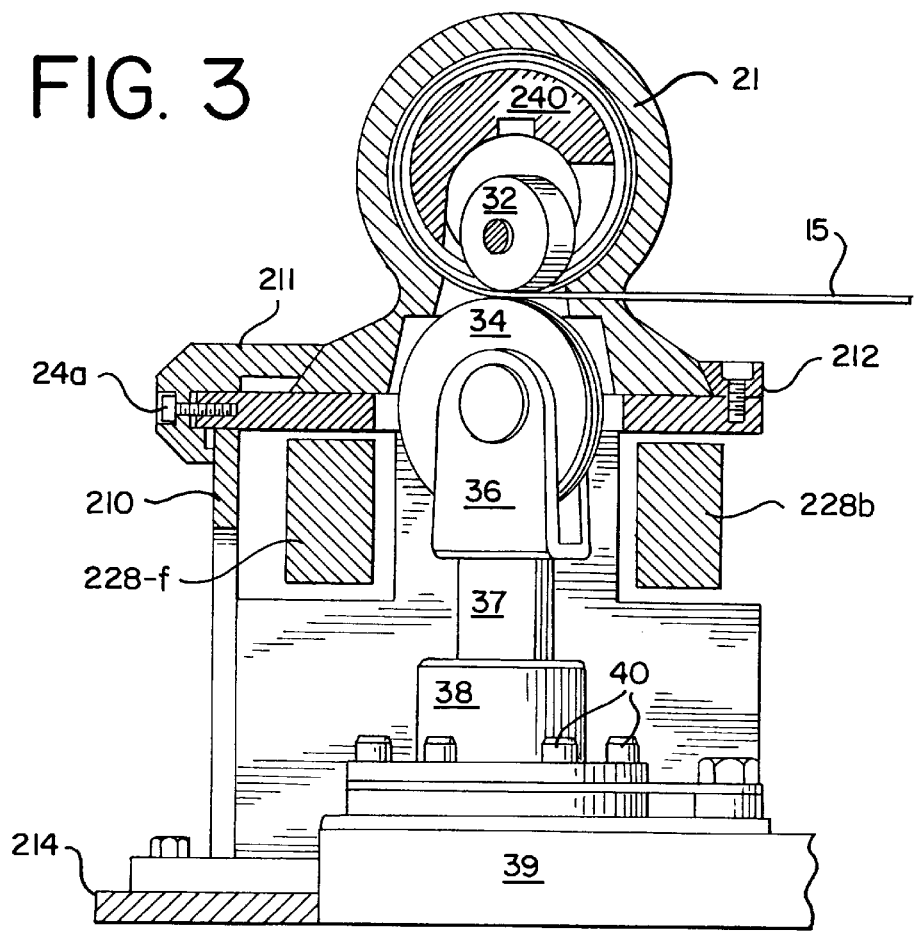
FIG. 3 is a sectional view taken through lines 3—3 of FIG. 4.

Referring to FIG. 1, the slitter assembly 200 of the present invention is shown with a spiral pipe forming machine 10. The spiral pipe forming machine shown in FIGS. 1–3 is available from Spiral-Helix, Inc. in Buffalo Grove, Ill. U.S. Pat. Nos. 4,567,742 and 4,706,481 also describe suitable pipe formers in greater detail. The specifications of these patents are incorporated by reference herein. The slitter assembly 200 can be readily adapted for use with other types of spiral tube forming machines that use an open forming head allowing the slitter access into the pipe at the end at which it is formed. Of course, it is contemplated that the broad teachings of the present invention embodied in the slitter assembly 200 may be applied to other types of spiral tube forming machines as well.

The spiral pipe producing machine 10, as shown in FIG. 2, has a frame 11 which rests on a base 11a. A guide slot (not shown) in the base 11a allows for adjustment of the angular orientation of the machine frame 11 with respect to the forming head 21. The orientation of the machine frame 11 determines the diameter of the pipe 42 produced. A control cabinet 12 is connected to the frame 11. A plurality of control knobs, gauges, and dials 14 are located on the control panel 13 for controlling and monitoring the operation of the machine 10 and the slitter assembly 200.

A roller housing 16 is mounted in the frame 11. The roller housing contains a plurality of rollers which bend the edges of the metal strip 15 in predetermined shapes for forming a lockseam, and which may form corrugation grooves and stiffening ribs in the metal strip. An upper drive roller 18 and a lower drive roller 17 are rotatably mounted within the frame 11 adjacent the roller housing 16. The upper drive roller 18 pulls the metal strip 15 into the frame 11, through the roller housing 16, and over the lower drive roller 17. The drive rollers then cooperate to push the metal strip 15 between the upper guide plates 19 and the lower guide plates 20 into the forming head 21.

The forming head 21 curls the metal strip into a cylindrical spiral, whereby the opposing, preformed edges of the strip 15 mesh. The meshed or mated edges are then compressed between a support roller 32 and a clinching roller 34 to form a lockseam 43. The metal strip 15 is continuously pushed by the drive rollers 17, 18 through the forming head 21 and between the clinching roller 34 and support roller 32, in a spiral manner, so that a hollow, cylindrical metal pipe 42 is continuously produced with a spiral lockseam 43.

The support roller 32, shown in FIG. 3, is mounted on the upper guide plate 19. A support arm 22 (FIG. 2) pushes down on the support roller 32 and holds it in place. Preferably, the support arm is thin enough to fit within the tight confines of the slitter assembly 200. The support arm 22 rotates about an eccentric shaft (not shown) and clamps down the support roller 32. The eccentric axis also allows the support arm 22 to swing clear of the forming head 21 when the support arm is not in its clamping position. A control lever 26 (FIG. 1) is used to rotate the support arm 22 about its eccentric axis, and controls the pressure applied to the support roller 32. The locking lever 27 releases or locks the control lever 26.

The clinching roller 34 is moved into and out of its clinching position by a conventional hydraulic cylinder assembly, which operates in a known manner. The cylinder assembly, as shown in FIG. 3, includes a yoke 36 which holds the clinching roller 34. The yoke is appended to a piston rod 37, which slides in and out of the cylinder head 38. The cylinder head 38 is attached to the cylinder barrel 39 by bolts 40. The hydraulic cylinder assembly provides the pressure on the clinching roller 34 to close the lockseam 43.

The forming head 21 is secured to the forming head base 23 by clamp bars 211, 212 and bolts 24a. The first clamp bar 211 is bolted to the side of the forming head base 210 and the second clamp bar 212 is bolted to the top of the forming head base 210. The first clamp bar 211 thus facilitates interchangeability of any size forming head 21.

Figure 4:
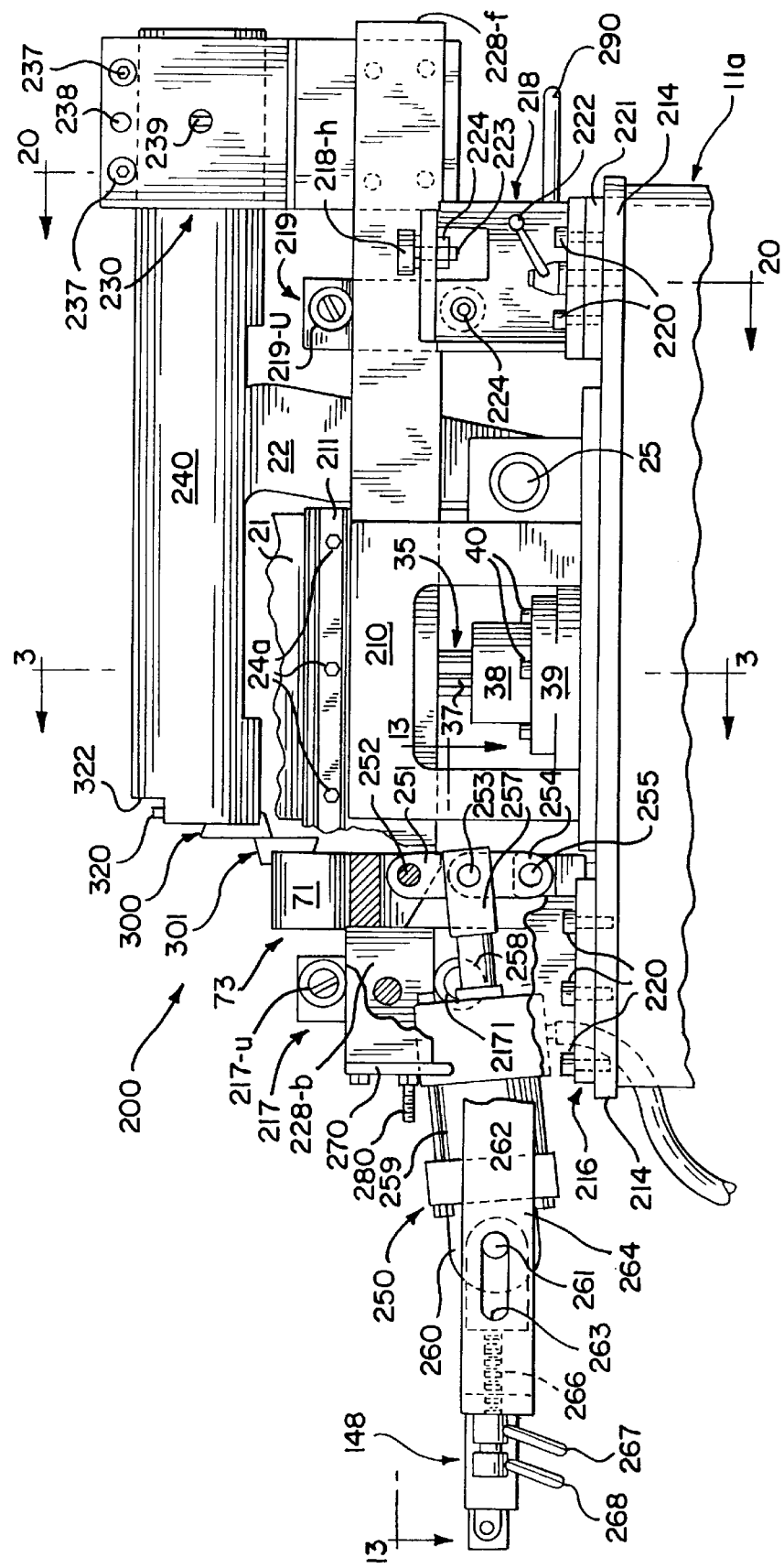
FIG. 4 shows the embodiment of FIG. 1 partially in elevation and partially in section.

The length of the forming head base 210, as shown in FIG. 4, is designed to prevent the lower cutting knife 301 from hitting the forming head base on its return to its starting position, and to facilitate adjustment of the starting position of the cutting knives 300, 301 for the cutting process. When the knives 300, 301 first overlap, it is preferred that they puncture the pipe 42 just in front of the pipe's lockseam 43. The toggle cylinder assembly 250 is not always strong enough to push the lower knife 301 up and through the thick lockseam 43. Once the toggle cylinder links are locked into their vertical position, however, (see FIG. 4), the toggle cylinder assembly is strong enough to maintain the knives in overlapping relationship while the pipe 42 rotates between the knives and the knives cut through the lockseam 43. Further, it is preferable to cut through the lockseam 43 close to the forming head base. If the lockseam is cut too far away from the forming head base, the pipe is more susceptible to wobble, which produces irregular cuts.

The presently preferred slitter assembly 200 is attached to the pipe forming apparatus 10 as described in greater detail below. Many components of the slitter assembly 200 are similar to those disclosed in U.S. Pat. No. 4,706,481, the entire disclosure of which is incorporated by reference herein. The slitter base plate 214 is preferably bolted to the spiral tube forming machine base 11a. In some instances, however, it may be necessary to mount the slitter assembly 200 on an adapter plate which is fastened to the machine base. The left two base legs 216 and 217 are directly fastened to the base plate 214 with allen bolts 220. The right two base legs 218 and 219 are fastened to a base adjustment plate 221 with allen bolts 220. A threaded bolt and locking lever 222 releasably secures the right legs 218, 219, and their attached base adjustment plate 221 to the base plate 214.

Referring now to FIGS. 1, 4 and 5, each of the base legs 216–219 is provided with a plurality of guide rollers. The left front leg 216 is provided with a lower, vertically disposed guide roller 216-l and an upper, horizontally disposed guide roller 216-h. The right front leg 218 also is provided with a lower, vertically disposed guide roller 218-*l* and an upper, horizontally disposed guide roller 218-*h*. The left back leg 217 is provided with a lower, vertically disposed guide roller 217-*l*, an upper, vertically disposed guide roller 217-*u*, and an upper, horizontally disposed guide roller 217-*h*. The right back leg 219 is provided with a lower, vertically disposed guide roller 219-*l*, an upper, vertically disposed guide roller 219-*u*, and an upper, horizontally disposed guide roller 219-*h*. The front base legs 216 and 218 are similarly constructed, and the back base legs 217 and 219 are similarly constructed.

Each guide roller consists of a steel ring which rotates around a plurality of needle bearings positioned around a shaft. Suitable guide rollers for use in the slitter assembly 200 are standard cam follower rollers that are sold by several sources (e.g., IKO Bearings of Arlington Heights, Ill. or INA of Elk Grove Village, Ill.). A threaded end of the roller shaft 223 or 223-*e* extends through a hole in a base leg 216–219, and is locked to the respective leg with a nut 224. All of the guide rollers on the back legs 217 and 219, i.e., guide rollers 217-*l*, 217-*h*, 217-*u*, 219-*l*, 219-*h*, and 219-*u*, are mounted in their respective legs on eccentric shafts 223-*e*, so that the position of these guide rollers may be adjusted by turning their shafts 223-*e*. On the other hand, all of the guide rollers on the front legs 216 and 218, i.e., rollers 216-*l*, 216-*l* and 218-*h*, are mounted on straight shafts 223 that are not intended for adjustment.

The guide roller arrangement of the slitter assembly 200 is designed to facilitate linear motion of the cutting knives 300, 301, which are coupled to the linear guide beams 228-*f* and 228-*r* (collectively 228). Each base leg 216, 217, 218 and 219 has a lower guide roller 216-*l*, 217-*l*, 218-*l* and 219-*l*, respectively, which supports the guide rails 228, and provides a rolling surface over which the rails 228 can move in a linear, axial direction. These lower guide rollers are preferably mounted on their respective base legs at the same height so that the rails 228 are in a level plane and the weight of the rails is distributed over all four lower rollers. (Note that the right base legs 218 and 219 are slightly shorter than their paired left base legs 216 and 217, since the right base legs are mounted on the base adjustment plate 221.) Of course, the height of the lower guide rollers on the back legs 217-*l* and 219-*l* can be adjusted through their eccentric shafts 223-*e*.

All four base legs 216–219 also include a horizontally disposed guide roller 216-*h*, 217-*h*, 218-*h* and 219-*h*. The guide rails 228 slide between these horizontal rollers. The position of the horizontal rollers on the back legs 217-*h* and 219-*h* is adjusted through their eccentric shafts 223-*e*, so that the guide rails 228 do not move from side-to-side as they slide between the rollers. If there is any play during movement of the rails, it will be difficult to cut the pipe exactly the same each time. The four horizontal guide rollers 216-*h*, 217-*h*, 218-*h*, and 219-*h* are preferably mounted at the same height. They are also mounted below the centerline of the guide rails 228 so that a clean track will be available if the front and back rails are interchanged.

The two back legs 217 and 219 each carry an upper, vertically disposed guide roller 217-*u* and 219-*u*, respectively. The height of these two rollers is adjusted via their eccentric shafts 223-*e* so that the back guide rail 228-*b* moves between the back lower guide rollers 217-*l*, 219-*l* and the back upper rollers 217-*u*, 219-*u* without any vertical play. The upper guide rollers 217-*u* and 219-*u* are needed on the back base legs since the forces on this side of the slitter assembly can act both upwardly and downwardly during the cutting operation. Vertically disposed upper guide rollers are not required on the front base legs 216, 218, because all the forces acting on this side of the slitter are downward. However, heavier duty guide rollers are used on the front legs 216 and 218 since the rotation of the pipe pushes the slitter towards the front legs during cutting.

The two guide rails 228 are separated at their left ends by a cold rolled spacer rod 245, which is bolted to the rails. At their right ends the guide rails 228 are separated by the legs 231 and 232 of the vertical boom holder 230. The boom holder legs 231 and 232 are fastened to the front and back guide rails 228-*f* and 228-*b*, respectively, with bolts 233. (See, e.g., FIG. 20) The opening between the two legs 231 and 232 provides clearance for the support arm 22.

The upper part of the boom holder 230 has a central cavity that accepts the cantilevered boom 240. This central cavity is defined by two arms 234 and 235 which are separated by a split opening 236. Two allen bolts 237 are provided to tie the arms 234, 235 of the boom holder together, thereby adjusting the diameter of the central opening and the width of the split opening 236. A set screw 238 is provided for pushing the arms 234 and 235 apart, thereby enlarging the split opening 236 and the central cavity, when the allen bolts 237 are loosened. An alignment pin 239 is inserted through the front arm 234 to maintain the boom 230 in a fixed orientation. The alignment pin 239 fits snugly in a corresponding hole in the boom 240.

The vertical boom holder 230 eases removal of the boom 240, especially if the pipe buckles during cutting and the slitter gets jammed. To remove the boom 240, the alignment pin 239 is removed from the boom 240, the allen bolts 239 are loosened, and the set screw 238 is turned inwardly to separate the arms 234 and 235 of the boom holder 230. The boom 240 can then be slid out of the boom holder 230. Inserting a boom 240 into the boom holder 230 is equally easy. Specifically, turn the set screw 238 to separate the arms 234, 235, insert the boom 240 into the central cavity, insert the alignment pin 239 firmly into the boom 240, and tighten the allen bolts 237 until the arms 234 and 235 tightly grasp the boom.

A larger diameter boom is better suited for larger diameter pipe, i.e., six inches and up. A boom holder 230 having a larger central cavity, but identical in other respects, is used with the larger boom. When using the heavier five inch boom, it would also be preferable, but not necessary, to make the back guide rail 228-*b*, the legs and center section of the lower knife guide assembly 73, and the diameter of the lower knife 301 wider. A 2⅛ inch diameter boom can also be used with the slitter assembly 200 for cutting smaller diameter pipe. In one embodiment, this boom is 3.5 inches in diameter at its right end that connects to the boom holder 230. The boom then narrows near its center to 2⅛ inches in diameter. This smaller boom will work with pipe as small as 3⅜ inches in diameter.

Whatever the boom diameter, the length of the boom 230 should always be the same, so that the upper knife 300, at the left end of the boom, will always have the same lateral separation from the lower knife 301. In fact, one of the functions of the alignment pin 239 is to assure that the upper knife 300 is always in the same lateral position relative to the lower knife 301.

Of course, booms of different diameters will be carved out to varying degrees. A smaller diameter boom is carved out less than wider booms because it is used with a smaller support roller 32. On the other hand, a five inch diameter boom is used with a larger support roller 32 and support arm 22, and thus is carved out more. The degree of carving out depends on the particular application. An important criteria is that the boom provide adequate clearance for the support arm 22 and support roller 32, while retaining sufficient strength to hold an upper cutting knife 300. The upper cutting knife 300 is adjustably affixed to the front end of the boom 240 in a receptacle 318.

FIGS. 6 and 7 show a preferred non-rotatable knife 300, 301 that may be used with the slitter 200 for both the upper 300 and lower 301 knife. The knife 300, 301 has two curved ends 302 on opposite ends of the knife. The knife also has two flat, parallel sides 304 that connect the curved ends 302. The knife may be constructed from a single piece of A2-60–62° HRC steel. Each curved end 302 is preferably beveled and has one cutting edge 306. The bevel on each end of the knives minimizes the friction between the end of the knife and a pipe by reducing the surface area in contact with the pipe. In a preferred embodiment, the bevel is formed at an angle of between approximately 10° to 30° with a line perpendicular to the two faces 303 of the knife. Other angles may also be used for the bevel.

Two oval slots 308 penetrate through the thickness "t" of the knife and are oriented parallel to one another. The oval slots extend between the curved ends 302 of the knife. A concentric oval groove 310 surrounds each of the oval slots 308 on the cutting edge side of each knife forming a ledge for a bolt head to tighten against. The same lower knife 301 can be used for all size upper knives 300. It may be preferable, however, to use a wider lower knife 301 having a more sharply curved cutting edge 306 with a wider upper knife 300 for cutting triple rib spiral seamed pipe.

Figure 9:
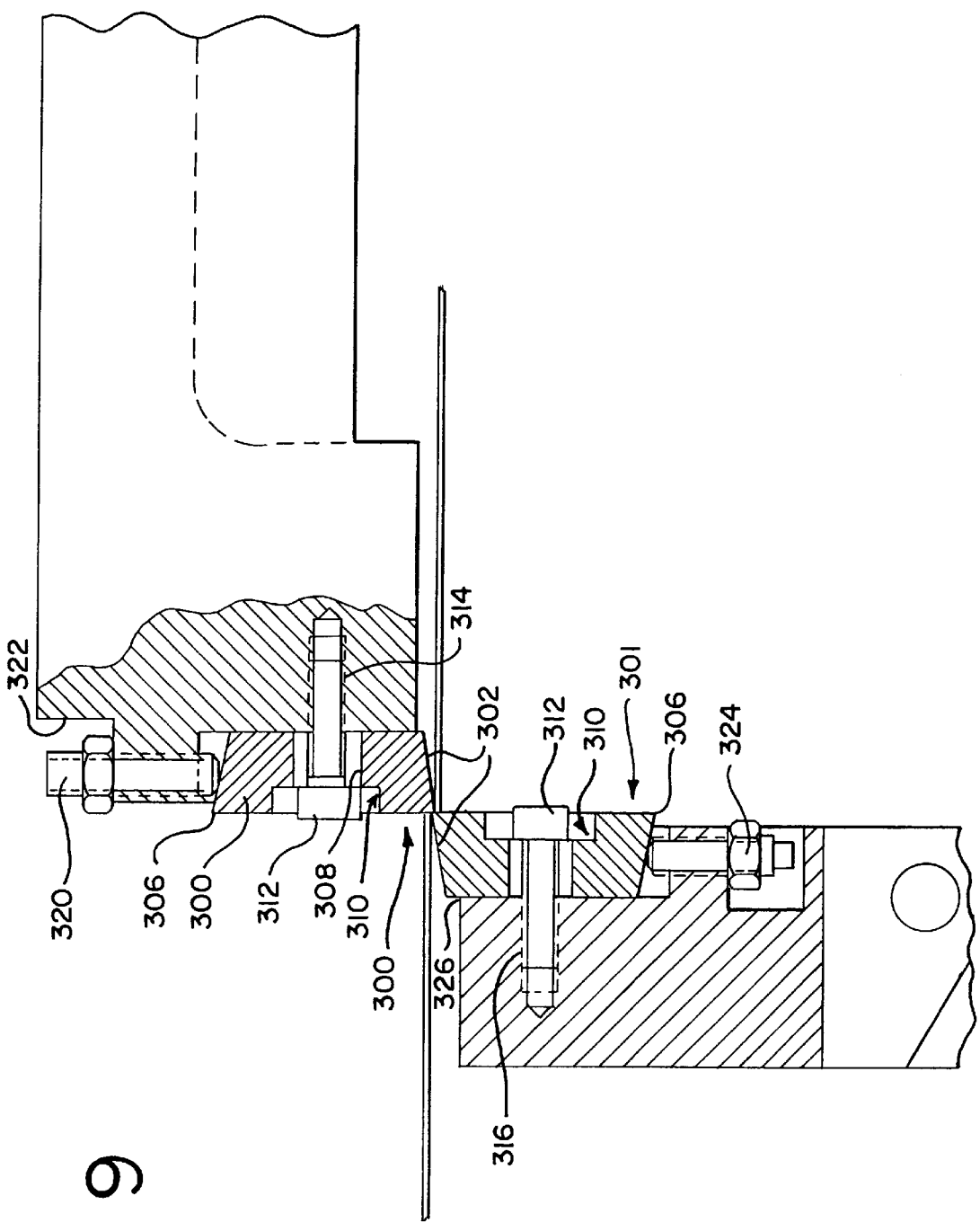
FIG. 9 is a side sectional view of the pipe cutting apparatus of FIG. 8.
Figure 13:
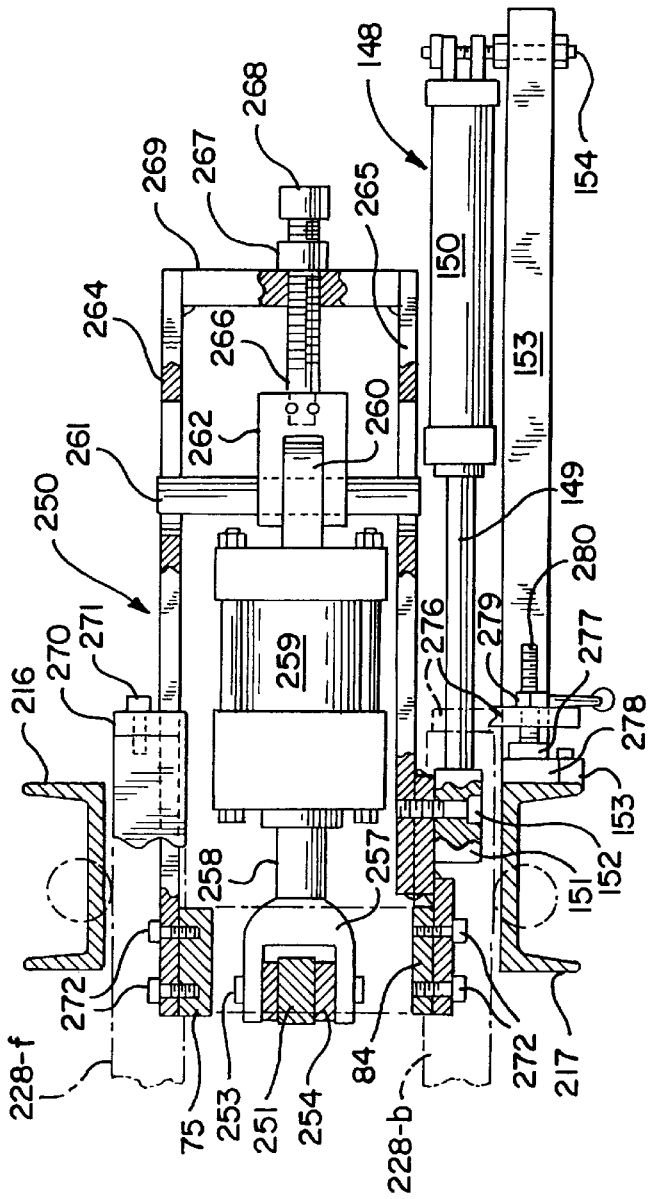
FIG. 13 is a sectional view taken through lines 13—13 of FIG. 4.

As shown in FIGS. 8 and 9, the knives 300, 301 are adjustably attached to the boom 240 and the lower knife guide assembly 73 with bolts 312. Bolts 312 are positioned in each of the slots 308 and tightly threaded into threaded portions 314 in the boom and threaded portions 316 in the lower knife guide assembly 73. The receptacle 318 on the boom 240 is preferably a recessed region in the end of the boom 240 designed to receive the upper knife 300. The receptacle 318 has two side walls that fit snugly against the flat, parallel sides 304 of the knife 300. The side walls of the receptacle and the two bolts 312 prevent any rotational movement by the knife. A set screw 320 is positioned in a cutaway area 322 adjacent to the receptacle 318 on the boom 240. The end of the set screw extends radially through the boom into the receptacle 318 and abuts a curved end 302 of the knife 300. The knife may be adjusted by loosening the bolts 312 holding the knife in the boom and sliding the knife to a desired position near the interior circumference of a pipe to be cut. After re-tightening the bolts 312, a user then can tighten the set screw 320 to prevent any movement by the knife 300 in the radial direction with respect to the pipe.

Similarly, as shown in FIGS. 8 and 9, the lower knife is held in a lower knife receiving area 326 by bolts 312. A lower knife set screw 324 abuts the curved end 302 of the knife, opposite the curved end that is being used to cut the pipe, to eliminate any radial movement. The upper and lower knives 300, 301 are intended to be interchangeable, when the upper and lower knives 300, 301 are the same size.

FIGS. 10 and 11 illustrate an alternative embodiment for the knives 350, 351. In this embodiment, the knives 350, 351 also have curved ends 352 on opposite ends of the knife and two flat, parallel sides 354 connecting the ends 352. Each curved end has two cutting edges 356 separated by the thickness "t" of the knife. Unlike the embodiment of FIGS. 6 and 7, the curved ends 352 in FIGS. 10 and 11 are perpendicular to the two faces 353 of the knives 350, 351.

Two oval slots 358 penetrate through the thickness "t" of the knife between the opposing faces 353. A concentric oval groove 360 surrounds each oval slot 358 on both sides of the knives. An advantage of this embodiment is that each knife has four cutting edges 356, each of which can be used by orienting the knife so that the desired cutting edge is oriented to overlap with the cutting edge of the other knife. When one cutting edge becomes worn, the knife may be removed, turned or flipped, and reattached by the bolts 312 so that a new cutting edge 356 is positioned for use.

The lower knife guide assembly 73 used in the slitter assembly 200 is shown in FIGS. 8, 9 and 12. This assembly includes a first guide leg 75 which is secured to the rear guide rail 228-b with screws 77. Holes 77a are provided in the first leg 75 for the screws 77. A second leg 84 is attached to the other guide rail 228-f with more screws 77 and screw holes 77a. An intermediate leg 80 is connected to the second leg 84 with bolts 85. These three legs are made of heat treated steel, hardened to 58–60 Rockwell. Both the first leg 75 and the intermediate leg 80 have integral v-shaped tongues 81 facing towards each other. A center section 78, with v-shaped slots 79, is adapted to slide up and down on the v-shaped tongues 81. Linear v-shaped needle bearing strips (not shown), sold by IKO Bearings, Arlington Heights, Ill., are placed between the v-shaped slots 79 and the v-shaped tongues 81 to allow the center section 78 to move with little frictional resistance. A retaining lip is attached to the top and bottom of the v-shaped slots 79 to keep the bearing strips 87 in place. Four hex screws 88 are threaded into holes in the second leg 84. The ends of these screws 88 engage the surface of the intermediate leg 80 to apply pressure on the bearing strips 87 between the center section 78 and its two adjacent legs 75 and 80. The pressure on the bearing strips should be adjusted with the hex screws 88, so that there is no play in the lower knife 300, either up-and-down or side-to-side. Play in the cutting blade will leave burrs and/or bad cuts. The bottom ends of the first leg 75 and the second leg 84 are tied together with a strut 90 and bolts 91.

Referring to FIGS. 1 and 4, a heavy duty toggle cylinder assembly 250 is used with the slitter assembly 200 to move the center section 78 of the lower knife guide assembly 73, and hence the lower knife 301, up and down. One suitable cylinder for the toggle cylinder assembly 250 is a 3.5 inch diameter, 1 inch stroke pneumatic cylinder sold by Milwaukee Cylinder Co. The toggle cylinder assembly 250 has a single upper toggle link 251 which is pivotally connected to the center knife holder section 78 with an upper pin 252. The upper toggle link 251 is also pivotally connected to a central pin 253. The lower toggle links 254 comprise two pieces which are pivotally connected at one end to the central pin 253, and at the other end to a lower pin 255. The lower pin 255 couples the lower toggle links 254 with the projection 256, which is integral with the strut 244. A yoke 257 couples the central pin 253 to a piston rod 258, which slides in and out of one end of the cylinder barrel 259. A trunnion 260 is connected to the opposite end of the cylinder barrel 259. A bar 261 extends through the trunnion 260, a second yoke 262, and the oval slots 263 in the support brackets 264 and 265.

The support brackets 264, 265 carry the toggle cylinder assembly 250. The front bracket 264 is attached to the bottom of the first leg 75 of the lower knife holder assembly 73 by bolts 272, and to the front guide rail 228-f by a flange 270. The flange 270 is welded to the front support bracket 265 and is attached to the left end of the front guide rail 228-f with bolts 271. The back bracket 265 is attached to the bottom of the second leg 84 of the lower knife holder assembly 73 with bolts 272. The left ends of the support brackets 264, 265 are tied together with an end plate 269. A threaded shaft 266 extends from the second yoke 262 through an opening in the end plate 269. A complementarily threaded locking lever 267 is located on the threaded shaft adjacent the end plate 269. An adjustment lever 268 is attached to the end of the threaded shaft 266 for turning the threaded shaft.

The toggle cylinder assembly 250 operates to move the lower cutting knife 301, through the center section 78 of the lower knife holder, into and out of its overlapping, cutting position with the upper knife 300. The toggle cylinder assembly 250 is also adapted to move axially with the guide rails 228 and lower knife holder assembly 73. The support brackets 264 and 265 are separated the width of the lower knife holder assembly 73 for their entire length to provide support for the heavier toggle cylinder. The diameter of the upper, central and lower pins 252, 253 and 255, respectively, is designed to prevent them from bending under heavier loads. These three pins preferably have the same size diameter. The upper toggle link 251 is one solid piece, and the lower toggle links 254 are placed next to the upper toggle link to require less force and lighter bearings for lifting the lower knife holder assembly 73.

To adjust the cutting and rest positions of the lower knife 301, the locking lever 267 is merely turned until loose. The depth adjustment lever 268 is then turned to move the cylinder barrel 259 axially along the slots 263 in the support brackets 264, 265. The locking lever 267 is then tightened when the desired adjustment is made.

The slitter assembly 200 includes an adjustable linear motion (or axial motion) stop 276 as shown in FIG. 11. The stop plate 276 is attached to the left end of the back guide rail 228-b with bolts 281. A threaded bolt 280 is secured to the stop plate 276 with a nut 279. A lever is attached to the nut for ease of adjustment. The head 277 of the bolt 280 engages a rubber pad 278 affixed to the back, left base leg 218 on the side opposite the wiper assembly 285. When the friction compensating cylinder 148 returns the guide rails 228 and attached cutting knives 300, 301 towards their starting position after a cut is completed, the bolt head 277 will engage the rubber pad 278 to terminate the linear (axial) return motion. The stop plate 276 thus controls the starting position for the knives 300, 301. The starting position can be adjusted by adjusting the distance between the stop plate 276 and the bolt head 277.

The starting position of the knives 300, 301 usually needs to be adjusted whenever the forming head 21 is changed to make new pipe having a different radius. The different size forming head and pipe will usually change the location of the lockseam relative to the knives. Thus, it is advantageous to adjust the starting position of the knives, so that the knives will initiate the cutting process just before the lockseam for the reasons stated above.

Referring to FIGS. 5–5g, the pitch of the slitter is adjustable. The right base legs 218 and 219 of this slitter 200 are attached to the base adjustment plate 221, so that these legs and plate 221 can be moved together. The right base legs 218 and 219 and pitch adjustment plate 221 are provided with angled adjustment slots 291 which allow these connected base legs to be moved side-to-side along an arcuate path. A lever 290 is used to effect the pitch adjustment of the slitter assembly. This pitch adjustment lever 290 has a first circular shaft 292 that is rotatably mounted in the base adjustment plate 221, and a second circular shaft 293 that is eccentrically mounted on the first shaft 292 and is rotatably mounted in an oval slot 294 in the slitter base plate 214.

The pitch of the slitter assembly 200 is adjusted in the following manner. Threaded bolts and locking levers 222 on the right base legs 218, 219 are loosened, so that the right base legs and pitch adjustment plate 221 are freed from the base plate 214. The pitch adjustment lever 290 is then turned counterclockwise, for example, which causes the pitch plate 221 and attached right base legs to rotate counterclockwise along their adjustment slots 291. When the pitch of the slitter achieves the proper alignment between the upper and lower knives 300, 301 (i.e., to attain a clean, rectangular pipe cut), the locking levers 222 are tightened to lock the right base legs and pitch adjustment plate 221 to the base plate 214.

Figure 14:
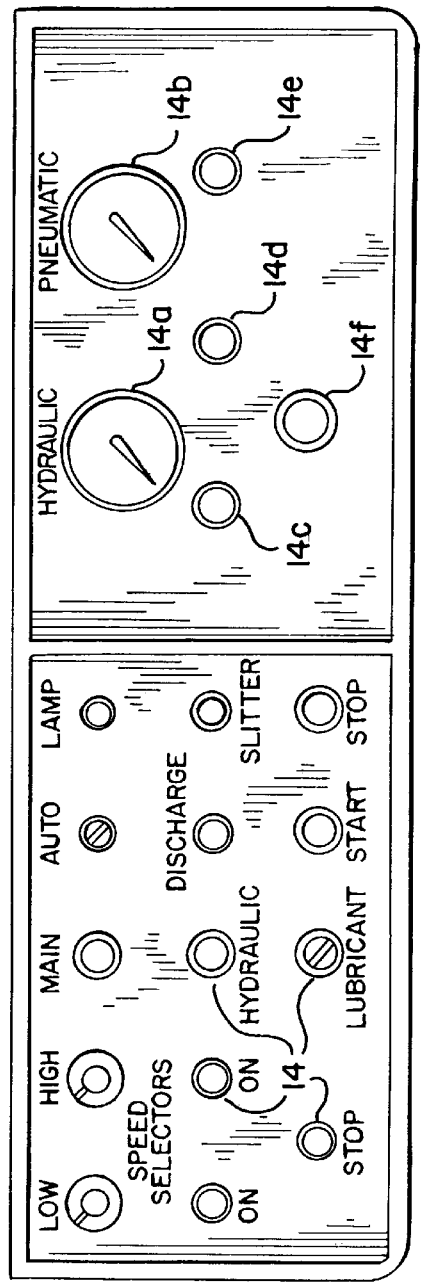
FIG. 14 is a plan view of the control panel of a spiral pipe producing machine incorporating the present invention.

The operation of the slitter assembly shown and described above will now be explained, with particular reference to FIGS. 14 and 15. The dials and switches 14 on the left-hand side of the control panel 13 perform the same function they have performed spiral pipe producing machines which have been on the market for over one year. Slitter start and stop buttons can be used to trim the leading edge of the pipe 42 using the slitter assembly 200. The LOW dial controls the pipe speed during the slow down phase and cutting operation, although the cutting speed is not as dependent on strip thickness and pipe diameter.

On the right-hand side of the control panel, the hydraulic gauge 14a is controlled by the dial 14f. When the dial 14f is at a first setting, the hydraulic gauge 14a will indicate the hydraulic pressure on the upper drive roller 18. In a second dial setting, the hydraulic gauge 14a displays the clinching roller 34 pressure. In a third setting the drive motor pressure is read, and in a fourth position the pump pressure is displayed. The drive roller hydraulic relief valve 14c controls the drive roller pressure, and the clinching roller hydraulic relief valve 14d controls the clinching roller pressure. The pneumatic pressure gauge 14b displays the pressure on the friction compensating cylinder assembly 148. The pneumatic relief valve 14c adjusts the pneumatic pressure on the return stroke of the piston rod 149 (i.e., during the cutting process).

Figure 15:
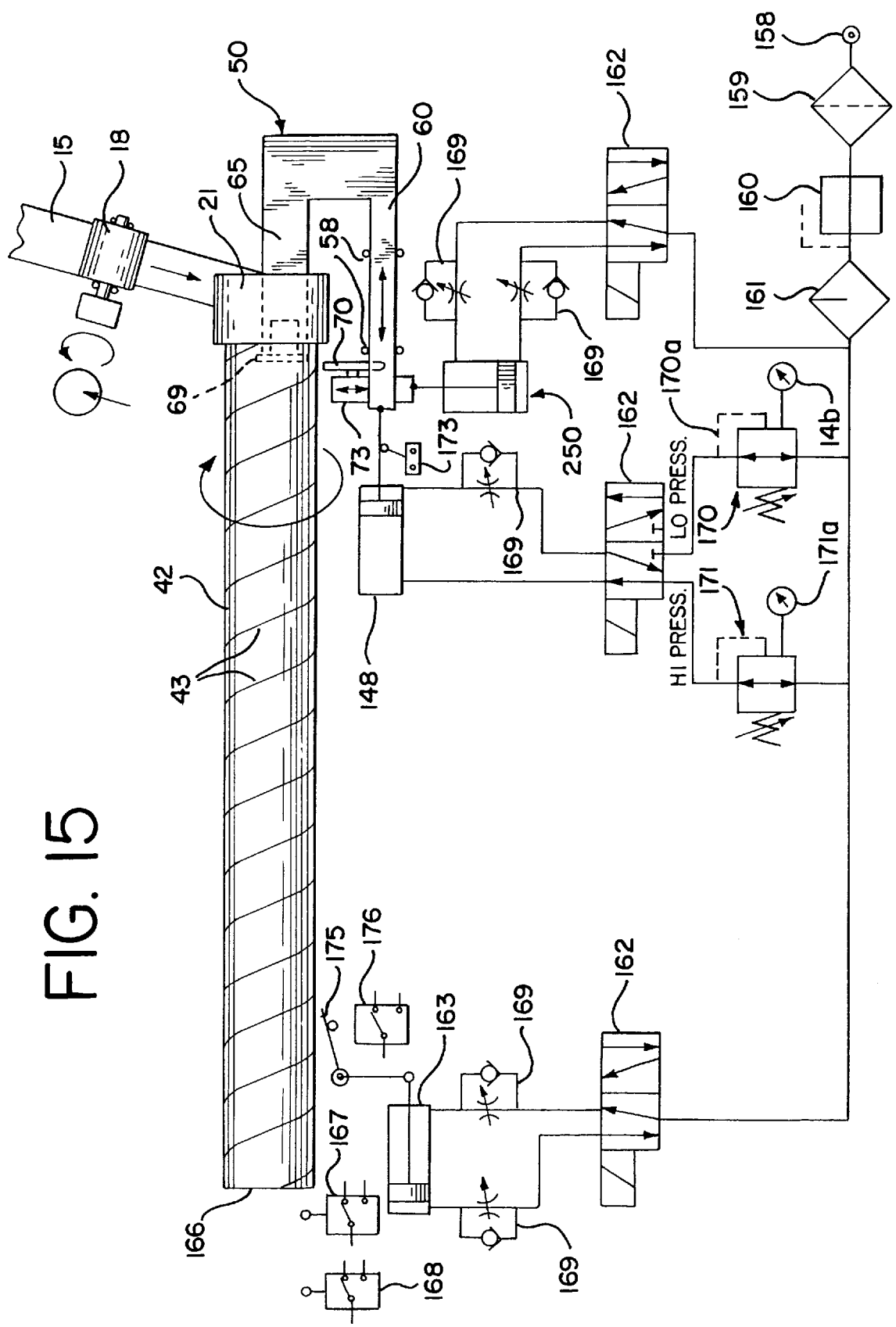
FIG. 15 is a schematic diagram of the pneumatic control system of the present invention.

The schematic diagram for the pneumatic control system of the slitter assembly 200, shown in FIG. 15, contains several conventional items which perform in a known manner. For example, the source of air 158 is connected through a filter 159, a pressure regulator 160, and a lubricator 161. Directional valves 162 control the operation of the toggle cylinder assembly 250, the friction compensating cylinder 148, and a pipe discharge cylinder 163.

Spiral seamed pipe is made with the pipe producing machine 10 in a known manner. The metal strip 16 can be fed into the machine 10 and formed into spiral seamed pipe in the manner set forth in U.S. Pat. No. 4,567,742. Once the metal strip has been inserted into the machine, the operator starts the main motor (oil pump) by pushing the MAIN button. Next, the LUBRICANT button is pushed to start the lubrication pump. The LOW speed selector is adjusted to set the cutting speed, and the HIGH speed selector is set to adjust the pipe production speed. The operator then selects either manual or automatic operation using the AUTO control knob. When the operator hits the HIGH in the automatic mode, the pipe producing machine 10 will continuously make pipe, and the slitter 200 will continuously cut into sections. In manual mode the pipe producing machine 10 will continuously make the pipe, and the slitter will automatically cut the pipe into a section, but the pipe producing machine will turn off after the pipe section has been discharged. The present embodiment of the invention runs under a conventional programmable controller. Of course, switches and delay timers could be used instead.

Referring now to FIG. 15, as the metal strip 15 is formed into spiral seamed pipe 42, the pipe 42 rotates and moves forward axially. When the outer edge 166 of the pipe hits a first limit switch 167, the upper drive roller 18 slows down. Hence, the pipe 42 moves more slowly. When the pipe 42 next hits the second limit switch 168, the pipe producing machine turns the upper drive roller off, and the pipe 42 stops moving. Air is then supplied to the toggle cylinder assembly 250 to raise the lower knife 301. The lower knife is raised until its cutting edge overlaps the cutting edge of the upper knife and punctures the pipe 42. Restricted orifices and check valves 169 are provided on the inlet and outlet lines of the toggle cylinder assembly 250, so the lower knife guide assembly 73 does not rise or fall too fast.

After a 1–2 second delay, the upper drive roller 18 starts again on slow speed, and the friction compensating cylinder 148 reverses direction. Thus, the pipe 42 starts moving forward and spirally rotating again. However, the pipe 42 will rotate between the overlapping upper and lower knives 300, 301. The rotating pipe turns between the overlapping knives 300, 301. The rotating pipe turns between the overlapping knives 300, 301 so that the fixed, non-rotating knives cooperate to cut the pipe as it rotates. The knives 300, 301, and the components of the slitter assembly attached thereto will move in the direction of the pipe, due to the moving pipe pushing on the knives and the pulling action of the friction compensation cylinder assembly 148. After one full rotation of the pipe 42, the pipe should be completely cut rectangularly (i.e., perpendicular to the axis of the pipe) by the upper and lower knives.

The friction compensating air cylinder 148 operates under low pressure on its return ("pull") stroke. This pressure is controlled by a pressure relief valve 170, which is adjusted using the pneumatic control knob 14e on the control panel 13. The dashed line 170a represents the relief line. The pulling pressure must be adjusted to compensate for any frictional resistance in the linear bearing units 58. The pressure in the cylinder 148 should balance the friction in the bearings so that the knives 300, 301 will move laterally at the touch of a finger. This pressure balance can be obtained by manually adjusting the cylinder pressure while pushing on the boom 240, or automatically with valves. The pressure compensating cylinder 148 allows the knives and attached components to move axially with the pipe, so that the only force on the knives is the force of the pipe rotation.

In order to achieve a clean, rectangular cut of the pipe, it is important that the knives 300, 301, and all parts attached thereto, are properly aligned and moved as if there were no friction. It is also important that the knives have the proper clearances and no play. If everything is not properly adjusted, the cut may not be rectangular. Instead, the cut could be spirally configured, so that the starting point and end point of the cut do not meet.

High pressure is used to return ("push") the pressure compensating cylinder 148 back to its starting position, since the extension stroke of piston rod 149 is not as sensitive. A pressure relief valve 171 is used to adjust this pressure. The relief value 171 and pressure gauge 171a are located inside the control cabinet 12. A check valve and restricted orifice 169 are used to dampen the high pressure return.

The slitter assembly 200 continues to move with the pipe until the slitter assembly contacts a third limit switch 173. This limit switch is placed at a position at which any size (diameter) pipe made with the pipe producing machine 10 and slitter assembly 200 would complete one rotation, so that the cut will be complete. The limit switch 173 should actually provide for a little overlap in the cut. If the cut is not quite complete, two sections of pipe will be attached by a sliver of metal. Pipe ranging from 4 inch to 24 inch diameters will complete one rotation in approximately 5½ inches of axial movement. The pipe producing machine 10 then stops again. The toggle cylinder assembly 250 is lowered to the standby position. After a short time delay the friction compensating cylinder 148 reverses direction, and returns the knives 300, 301 to their starting position.

Next, the pipe discharge cylinder 163 raises arms 175 to discharge the cut section of pipe onto a run-off table. Check valves and restricted orifices 169 are provided so that the discharge arms 175 are raised and lowered slowly and gently. When the discharge arms 175 return they will close a fourth limit switch 176. The pipe producing machine 10 will not start again until this limit switch has been closed. If the pipe producing machine 10 is in automatic mode and the fourth limit switch 176 closes, the machine 10 and slitter 200 will automatically repeat the above process for forming and slitting pipe. If in manual mode, the operator must hit the HIGH button to repeat the above process for one more section of pipe.

Figure 16:
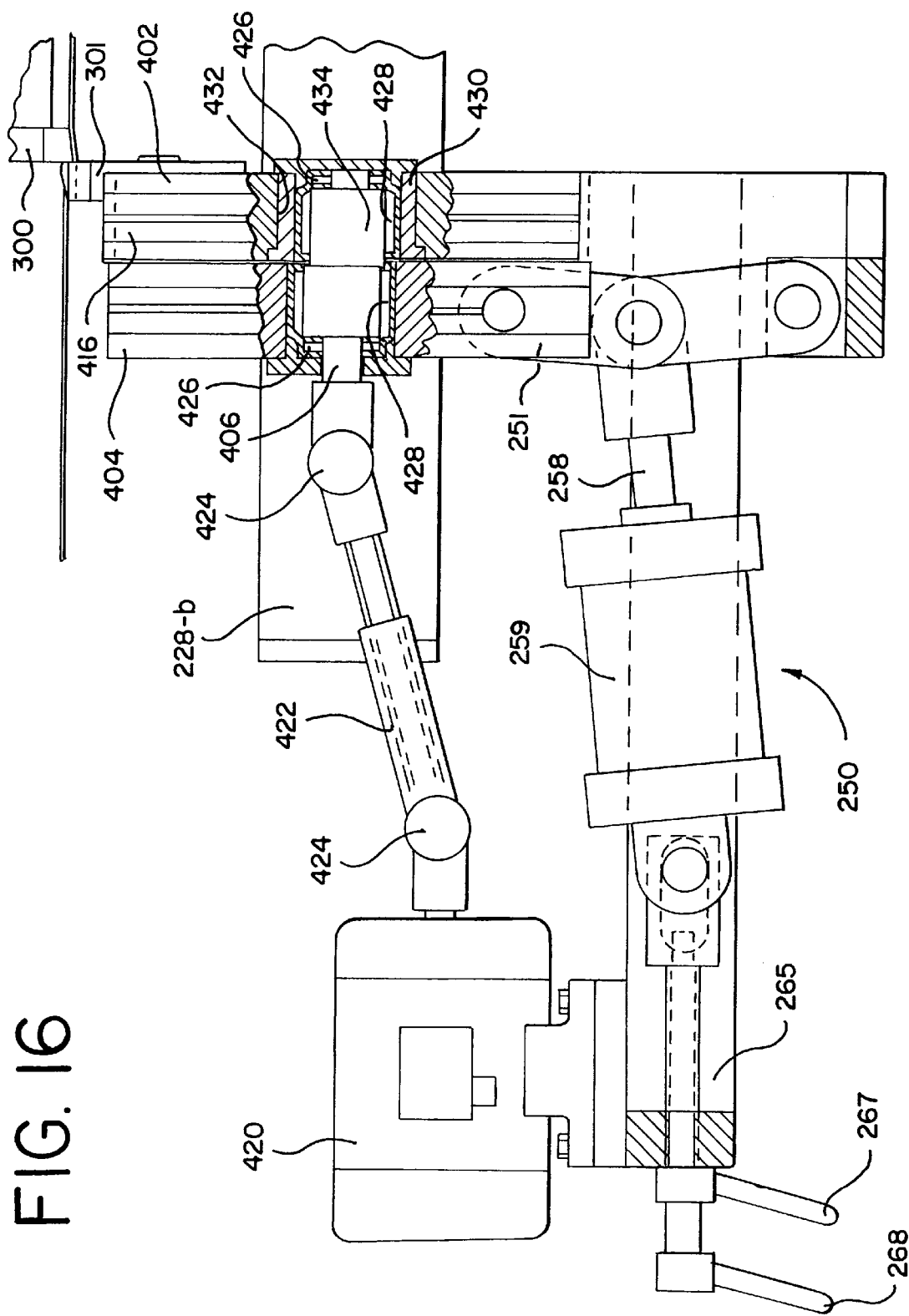
FIG. 16 is a side sectional view of a second preferred embodiment of the cutting apparatus.
Figure 17:
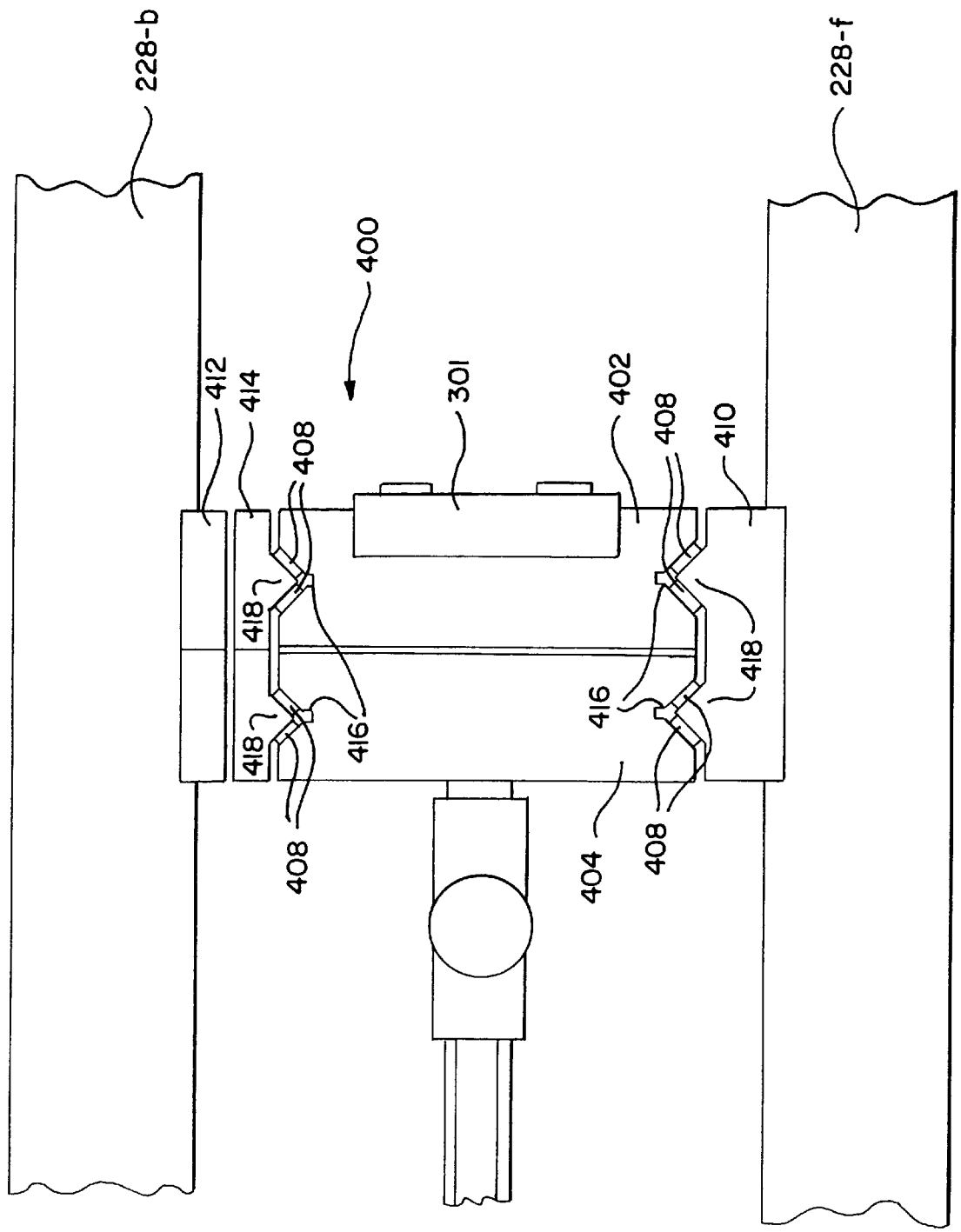
FIG. 17 is a top view of the cutting apparatus of FIG. 16.
Figure 18:
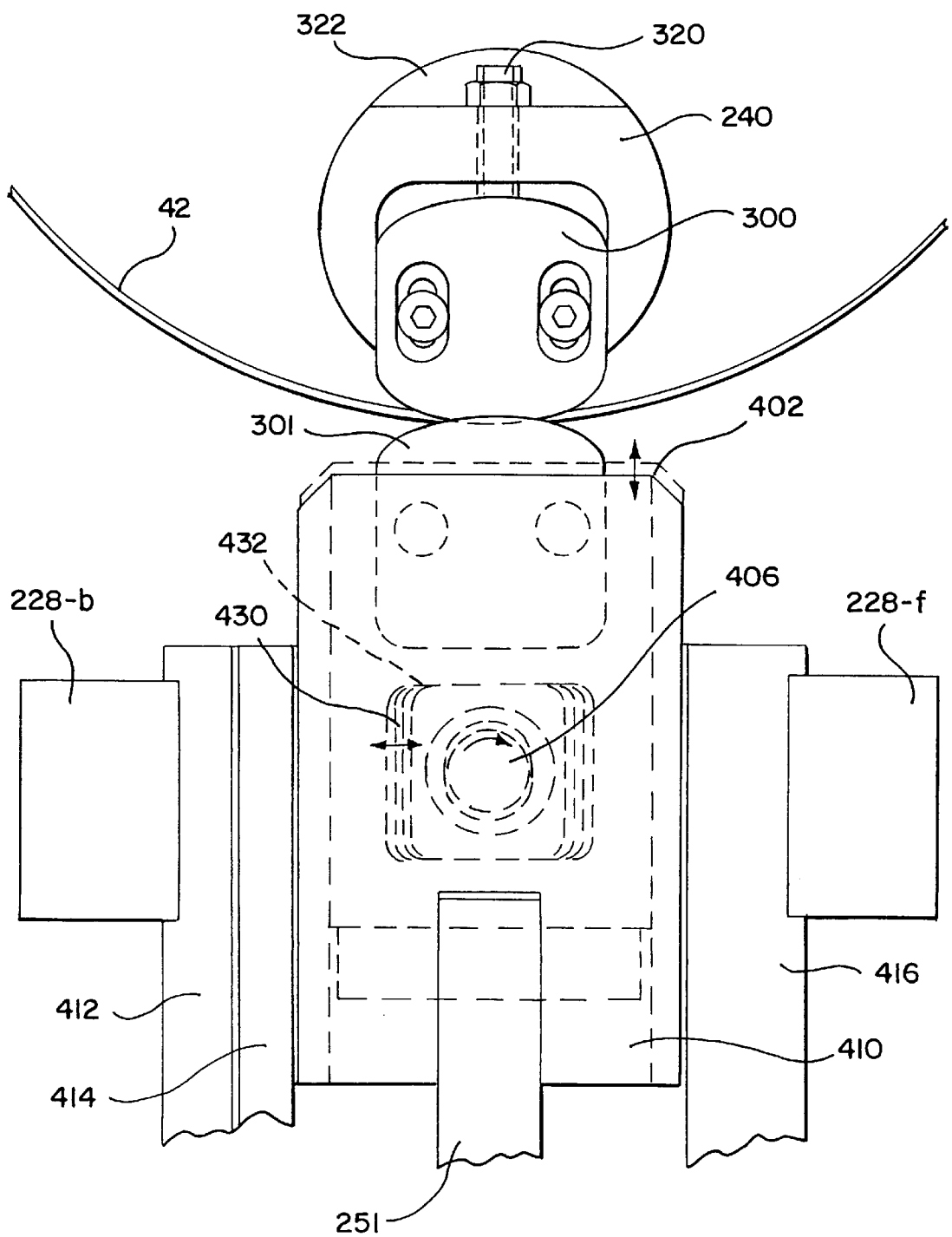
FIG. 18 is a front sectional view of the cutting apparatus of FIG. 16.

An alternative embodiment of the preferred slitter assembly is shown in FIGS. 16–18. In this embodiment, the pipe cutting portion continuously reciprocates the lower non-rotatable knife 301 up and down in the radial direction of the pipe while the pipe is being cut to aid in the cutting process. The same toggle cylinder assembly 250 as described above is used in this embodiment. The lower knife guide assembly 400 includes two separate center blocks 402, 404. A lifting center block 404 is connected to the upper toggle link 251 and is moved up and down by the cylinder 259 and cylinder rod 258. The knife holding center block 404 moves between a standby position where the lower knife 301 is kept clear of the pipe 42 and a cutting position where the lower knife punctures the pipe and overlaps the inner knife 300. The knife holding block 402 is slidably connected to the lifting block 404 by an eccentric shaft 406 extending through the lifting and oscillating center blocks 402, 404. The center blocks are parallel and vertically guided by needle bearings 408 positioned between the blocks and first and second side legs 410, 412. An intermediate leg 414 connects to the second leg 412. Both of the center blocks 402, 404 preferably have v-shaped grooves 416 that cooperate with v-shaped ridges 418 and the needle bearings 408 to facilitate their movement.

A motor 420 is mounted on the support bracket 265 holding the cylinder assembly 250. The motor 420 drives the knife holding block 402 via a sliding shaft having a universal joint 424 at either end. The motor may be a ⅛ horsepower DC motor capable of turning at 1700 RPM. The sliding shaft 422 extends and contracts as necessary to allow for the movement of the lifting block between a cutting and a standby position. The universal joints 424 facilitate the transfer of the motor's rotational energy to the eccentric shaft 406.

The eccentric shaft 406 passes through a bearing assembly in the lifting block 404 comprising thrust bearings 426 and needle bearings 428. The eccentric shaft 406 passes through the bearing assembly in the lifting block 404 and into a bearing assembly in the knife holding block 402. The bearing assembly, comprising thrust bearings 426 and needle bearings 428, is positioned inside a sliding member 430 in the knife holding block 402. The sliding member is horizontally slidable in an opening 432 in the knife holding block 402. Preferably, the opening is lubricated so that the sliding member can freely slide to either side. The offset portion 434 of the eccentric shaft 406 rests in the bearing assembly of the knife holding block 402. Thus, when the motor 420 turns the slidable shaft 422 and the eccentric shaft 406, the rotation of the offset portion 434 causes the knife holding block 402 to move up and down and the sliding member to slide back and forth. The offset portion of the eccentric shaft is preferably offset by a small amount, such as 0.030 inches, so that the knives 300, 301 are always overlapping when the lifting block is in the cutting position. The small movement of the knife holding block creates a scissors-type action that can aid in cutting heavier gauge pipe. In all other respects, the pipe cutting operation of the embodiment shown in FIGS. 16–18 is preferably the same as described for the embodiment of FIGS. 1–15. Preferably, the knives 350, 351 having the non-beveled ends may be used as an alternative to, or interchangeably with, the knives 300, 301 shown in FIGS. 16–18 having beveled ends.

It should be understood that various changes and modifications to the preferred embodiment described above will be apparent to those skilled in the art. It is intended that the foregoing description be regarded as illustrative rather than limiting, and that it be understood that it is the following claims, including all equivalents, which are intended to define the scope of the invention.

I claim:

1. An apparatus for cutting spirally formed pipe wherein the pipe is actively rotated in a predetermined direction about a longitudinal axis of the pipe and the pipe moves along the longitudinal axis, the apparatus comprising:
    a non-rotatable, radially fixed inner knife positioned inside the pipe;
    a non-rotatable outer knife positioned outside of the pipe; and
    a knife positioner connected to the outer knife, the knife positioner adapted to move the outer knife between a standby position, wherein the outer knife is spaced away from the pipe, and a cutting position, wherein the outer knife maintains a radially fixed position that overlaps the inner knife such that the pipe is severed as it rotates between the non-rotating, overlapping inner and outer knives and moves along the longitudinal axis.

2. The apparatus of claim 1 wherein the inner knife is adjustably fixed to a boom extending inside the pipe, and the inner knife is radially adjustable with respect to the pipe such that the inner knife is adjustable for use with pipes of different diameters.

3. The apparatus of claim 2 wherein the inner knife further comprises a pair of slots in the inner knife, each of the slots cooperating with a fastener to permit adjustment of the inner knife for different size pipes whereby the inner knife may be adjusted for cutting pipes having a predetermined range of pipe diameters.

4. The apparatus of claim 1 wherein the inner knife further comprises a plurality of cutting edges.

5. The apparatus of claim 4 wherein the outer knife further comprises a plurality of cutting edges.

6. The apparatus of claim 5 wherein the outer knife is adjustably mounted to the knife positioner outside the pipe, the outer knife adjustable to orient any one of the plurality of cutting edges to overlap the inner knife during a cutting operation.

7. The apparatus of claim 4 wherein the inner knife is adjustably mounted to a boom positioned inside the pipe, the inner knife adjustable to orient any one of the plurality of cutting edges to overlap the outer knife during a cutting operation.

8. The apparatus of claim 1 wherein the non-rotatable inner knife comprises at least one cutting edge positioned on a beveled end of the non-rotatable inner knife.

9. The apparatus of claim 1 wherein the non-rotatable outer knife comprises at least one cutting edge positioned on a beveled end of the non-rotatable outer knife.

10. An apparatus for cutting spirally formed pipe wherein the pipe rotates about a longitudinal axis and moves in the longitudinal direction, the apparatus comprising:
    a non-rotatable inner knife positioned inside the pipe;
    a non-rotatable outer knife positioned outside of the pipe, the outer knife having at least two curved cutting edges; and
    a reciprocating knife positioner wherein the reciprocating knife positioner comprises a lifting block and a reciprocating block, the lifting block attached to a lifting assembly adapted to move the outer knife between a standby position and a cutting position, wherein the inner and outer knives overlap and puncture the pipe in the cutting position, and wherein the reciprocating block is adapted to continuously reciprocate the outer knife in a radial direction with respect to the longitudinal axis of the pipe while maintaining the inner knife and the outer knife in an overlapping relationship during a cutting operation.

11. The apparatus of claim 10 wherein the inner knife is adjustably fixed to a boom extending inside the pipe, and the inner knife is radially movable with respect to the pipe such that the inner knife may be adjusted for use with pipes of different diameters.

12. The apparatus of claim 11 wherein the inner knife further comprises a pair of slots in the inner knife, each of the inner slots cooperating with a fastener to permit adjustment of the inner knife for different size pipes wherein the inner knife may be adjusted for cutting pipes having different diameters.

13. The apparatus of claim 10 wherein the outer knife and the inner knife each comprise a plurality of cutting edges.

14. The apparatus of claim 13 wherein each of the plurality of cutting edges are curved.

15. The apparatus of claim 10 wherein the outer knife is removably connectable to the reciprocating block by at least one fastener.

16. The apparatus of claim 10 wherein the reciprocating block and the lifting block are axially connected together by an eccentric shaft.

17. The apparatus of claim 16 wherein the reciprocating block further comprises a bearing assembly attached to the eccentric shaft wherein the reciprocating block moves in a radial direction with respect to the pipe when the shaft rotates.

18. The apparatus of claim 17 wherein the bearing assembly is positioned in a sliding block slidably mounted in the reciprocating block, wherein a rotation of the eccentric shaft is transferred into a reciprocating motion of the outer knife.

19. A method of cutting a spirally formed pipe comprising the steps of:
    continuously rotating a spirally formed pipe in a predetermined rotational direction;
    providing a reciprocating knife positioner having a lifting block and a reciprocating block movably attached to the lifting block;
    moving the lifting block until an outer knife attached to the reciprocating block is in a cutting position, wherein the outer knife overlaps an inner knife positioned inside the pipe and punctures the pipe;

radially reciprocating the reciprocating block with respect to the pipe when the outer knife is in the cutting position, and maintaining the inner and outer knives in an overlapping relationship while rotating the pipe between the overlapping inner and outer knives; and retracting the outer knife after the pipe has completed a revolution.

20. A method of cutting a spirally formed pipe comprising the steps of:

continuously rotating a spirally formed pipe in a predetermined rotational direction;

moving a non-rotatable outer knife from a standby position to a cutting position, wherein the outer knife overlaps a non-rotatable inner knife and punctures the pipe;

maintaining the outer knife in a fixed radial position with respect to the pipe while the inner and outer knives are in the cutting position, wherein the inner and outer knives remain in a fixed overlapping position while the pipe rotates; and retracting the outer knife after the pipe has completed a revolution.

* * * * *